United States Patent
Park et al.

(10) Patent No.: US 9,385,383 B2
(45) Date of Patent: Jul. 5, 2016

(54) METHOD FOR GENERATING INJECTED CURRENT OF FUEL CELL STACK

(71) Applicant: Hyundai Autron Co., Ltd., Seongnam-si (KR)

(72) Inventors: Hyun-Seok Park, Gunpo-Si (KR); Uck-Soo Kim, Anyang-si (KR); Sun-Doo Kang, Yongin-si (KR)

(73) Assignee: Hyundai Autron Co., Ltd., Seongnam-si (KR)

( * ) Notice: Subject to any disclaimer, the term of this patent is extended or adjusted under 35 U.S.C. 154(b) by 288 days.

(21) Appl. No.: 14/135,211

(22) Filed: Dec. 19, 2013

(65) Prior Publication Data

US 2014/0176143 A1 Jun. 26, 2014

(30) Foreign Application Priority Data

Dec. 20, 2012 (KR) .................. 10-2012-0149916

(51) Int. Cl.
G01N 27/416 (2006.01)
H01M 8/04 (2016.01)
H01M 8/10 (2016.01)

(52) U.S. Cl.
CPC ...... *H01M 8/04679* (2013.01); *H01M 8/04529* (2013.01); *H01M 8/04559* (2013.01); *H01M 8/04649* (2013.01); *H01M 2008/1095* (2013.01); *Y02E 60/50* (2013.01)

(58) Field of Classification Search
CPC .................. H01M 8/04679; H01M 8/04529; H01M 8/04649; H01M 2008/1095; H02J 3/387; Y02E 60/50
USPC .................. 320/101; 324/426, 430, 434
See application file for complete search history.

(56) References Cited

U.S. PATENT DOCUMENTS

| 5,961,294 A | 10/1999 | Hataura et al. |
| 2007/0196707 A1* | 8/2007 | Komachiya ......... H01M 4/8642 429/432 |
| 2012/0135327 A1* | 5/2012 | Jeong ................ H01M 8/04313 429/431 |

FOREIGN PATENT DOCUMENTS

KR 10-2010-0121354 A 11/2010
KR 10-1090705 B1 12/2011

* cited by examiner

*Primary Examiner* — Edward Tso
*Assistant Examiner* — Aaron Piggush
(74) *Attorney, Agent, or Firm* — Morgan, Lewis & Bockius LLP

(57) ABSTRACT

Disclosed herein is a method for generating an injected current of fuel cell stack, including: generating a synthesized frequency current in a form in which a first frequency current is synthesized with a second frequency current; and applying the synthesized frequency current to the fuel cell stack, wherein the first frequency current and the second frequency current are each used to calculate at least one of total harmonic distortion and impedance. According to the embodiment of the present invention, a hardware configuration may be reduced by applying the synthesized frequency current of the AC current for calculating the total harmonic distortion (THD) and the AC current for calculating the impedance to the fuel cell stack, without generating the AC current for calculating the total harmonic distortion (THD) and the AC current for calculating the impedance, respectively, thereby reducing a price and a size of the fuel cell stack.

6 Claims, 4 Drawing Sheets

210

220

300

METHOD FOR GENERATING INJECTED CURRENT OF FUEL CELL STACK

CROSS REFERENCE TO RELATED APPLICATION

This application claims the benefit of Korean Patent Application No. 10-2012-0149916, filed on Dec. 20, 2012, which is hereby incorporated by reference in its entirety into this application.

BACKGROUND OF THE INVENTION

1. Technical Field

Exemplary embodiments of the present invention relate to a method for generating an injected current of a fuel cell stack.

2. Description of the Related Art

A fuel cell is a kind of power generating device that does not convert chemical energy of a fuel into heat by combustion, but converts the chemical energy into electrical energy by an electrochemical reaction in a stack and may be used to supply power to a small electric/electrical product, particularly, a portable apparatus as well as supply industrial power, home power, and power for driving a vehicle.

As a power supply source for driving the vehicle, a polymer electrolyte membrane fuel cell (PEMFC) (proton exchange membrane fuel cell) having the highest power density among fuel cells has been currently studied mainly. The polymer electrolyte membrane fuel cell has a rapid start time due to a low operation temperature and a rapid power conversion reacting time.

The polymer electrolyte membrane fuel cell is configured to include a membrane electrode assembly (MEA) in which catalyst electrode layers in which an electrochemical reaction occur are attached to both sides of a solid polymer electrolyte membrane through which hydrogen ions move, a gas diffusion layer (GDL) serving to uniformly distribute reaction gases and transfer generated electrical energy, a gasket and coupling mechanism maintaining air-tightness of the reaction gases and coolant and appropriate coupling pressure, and a bipolar plate moving the reaction gases and the coolant.

When a fuel cell stack is assembled using the configuration of a unit cell as described above, a combination of the membrane electrode assembly and the gas diffusion layer, which are main components, is positioned in the innermost portion of the cell, the membrane electrode assembly includes the catalyst electrode layers, that is, an anode and a cathode, formed on both surfaces of the polymer electrolyte membrane and having catalysts applied thereto so that oxygen and hydrogen may react to each other, and the gas diffusion layer, the gasket, and the like, are stacked on outer sides of the anode and the cathode.

The bipolar plate provided with a flow field supplying the reaction gases (hydrogen, which is a fuel, and oxygen or air, which is an oxidizer) and passing the coolant therethrough is positioned at an outer side of the gas diffusion layer.

After a plurality of unit cells each having the above-mentioned configuration are stacked, a current collector, an insulating plate, and end plates supporting the stacked unit cells are coupled to the outermost portion. The unit cells are repeatedly stacked and coupled to each other between the end plates to configure the fuel cell stack.

In order to obtain potential actually required in the vehicle, the unit cells should be stacked by the required potential, and a product formed by stacking the unit cells is called a stack. Potential generated by one unit cell is about 1.3V. Therefore, a plurality of cells are stacked in series with each other in order to generate power required for driving the vehicle.

Meanwhile, in a fuel cell vehicle, a voltage of a cell is used to detect performance, an operation state, a fault, and the like, of a stack, and is used for various controls of a system such as a flow rate control of reaction gas. Typically, the bipolar plate is connected to a cell voltage monitoring apparatus through a connector and a conducting wire to monitor the voltage of the cell.

A cell voltage monitoring (CVM) apparatus according to the related art, which directly monitors voltages of all cells or two cells in the stack, uses a scheme in which a main controller (host controller) collecting voltages of all cells integrates and processes monitoring information and a voltage drop generated due to a fault result rather than a fault cause is monitored.

The cell voltage monitoring apparatus as described above has also been used to monitor a battery. Since the cell voltage monitoring apparatus according to the related art directly monitors the voltages of the cells, a position of a fault cell may be monitored. However, since the cell voltage monitoring apparatus according to the related art has a very complicated circuit configuration, it may be difficult to assemble and maintain the cell voltage monitoring apparatus according to the related art. In addition, the cell voltage monitoring apparatus according to the related art is expensive and may not detect a fault cause of the stack.

Further, an electrochemical impedance spectroscopy (EIS) has been used as the related art. The EIS is mainly used to detect an electrode reaction or a feature of a complex in an electrochemical field. The EIS may obtain general information on a nature, a structure, and a reaction of the complex by analyzing a system response and has also been used as a very useful tool in an applied chemistry field, a medical engineering field, a bioengineering field, or the like.

However, the EIS, which is for an off-line, requires a long test time, may not perform real-time monitoring, is expensive, and may be used only for testing a unit cell.

SUMMARY OF THE INVENTION

An object of the present invention is to provide a method for generating an injected current of a fuel cell stack capable of operating the fuel cell stack by applying a synthesized frequency current in a form in which an AC current for calculating total harmonic distortion (THD) is synthesized with an AC current for calculating impedance to the fuel cell stack.

Another object of the present invention is to provide a method for generating an injected current of a fuel cell stack capable of improving diagnosis decomposition ability twice or larger by diagnosing a state of the fuel cell stack by simultaneously monitoring impedance and total harmonic distortion using data acquired by filtering an output voltage of the fuel cell stack.

Objects to be solved by the present invention are not limited to the above-mentioned objects, and other objects that are not mentioned may be clearly understood by those skilled in the art in the following description.

According to an exemplary embodiment of the present invention, there is provided a method for generating an injected current of a fuel cell stack performed by an apparatus for generating an injected current of a fuel cell stack, the method including: generating a synthesized frequency current in a form in which a first frequency current is synthesized with a second frequency current; and applying the synthesized frequency current to the fuel cell stack, wherein the first frequency current and the second frequency current are each used to calculate at least one of total harmonic distortion and impedance.

The method for generating an injected current of a fuel cell stack may further include: determining whether the fuel cell stack is faulty by using an output voltage of the fuel cell stack.

The determining whether the fuel cell stack is faulty may include passing the output voltage of the fuel cell stack through a band pass filter which passes through only a specific frequency and a high pass filter which passes through the specific frequency to a frequency of the specific frequency or more, respectively.

The determining whether the fuel cell stack is faulty may include: extracting a harmonic frequency from a fundamental wave frequency by passing the stack voltage through the high pass filter; and extracting the specific frequency by passing the stack voltage through the band pass filter.

The determining whether the fuel cell stack is faulty may include determining whether the fuel cell stack is faulty depending on a ratio of the harmonic frequency to the fundamental wave frequency which is extracted by the high pass filter.

The determining whether the fuel cell stack is faulty may include determining that the fuel cell stack is faulty when the ratio of the harmonic frequency to the fundamental wave frequency is a specific ratio or more.

The determining whether the fuel cell stack is faulty may include determining whether the fuel cell stack is in a wetting state by using the impedance of the specific frequency extracted by the band pass filter.

The determining whether the fuel cell stack is faulty may include determining that an electrolyte membrane of the fuel cell stack is in a dried state when the impedance of the specific frequency is specific impedance or more.

The determining whether the fuel cell stack is faulty may include determining that the electrolyte membrane of the fuel cell stack is in a wetting state when the impedance of the specific frequency is the specific impedance or less.

Specific matters of other exemplary embodiments will be included in a detailed description and the accompanying drawings.

Advantages and features of the present invention and methods to achieve them will be elucidated from exemplary embodiments described below in detail with reference to the accompanying drawings. However, the present invention is not limited to exemplary embodiment disclosed herein but will be implemented in various forms. The exemplary embodiments make disclosure of the present invention thorough and are provided so that those skilled in the art can easily understand the scope of the present invention. Therefore, the present invention will be defined by the scope of the appended claims. Like reference numerals throughout the description denote like elements.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, embodiments of the present invention will be described in detail with reference to the accompanying drawings.

Figure 1:
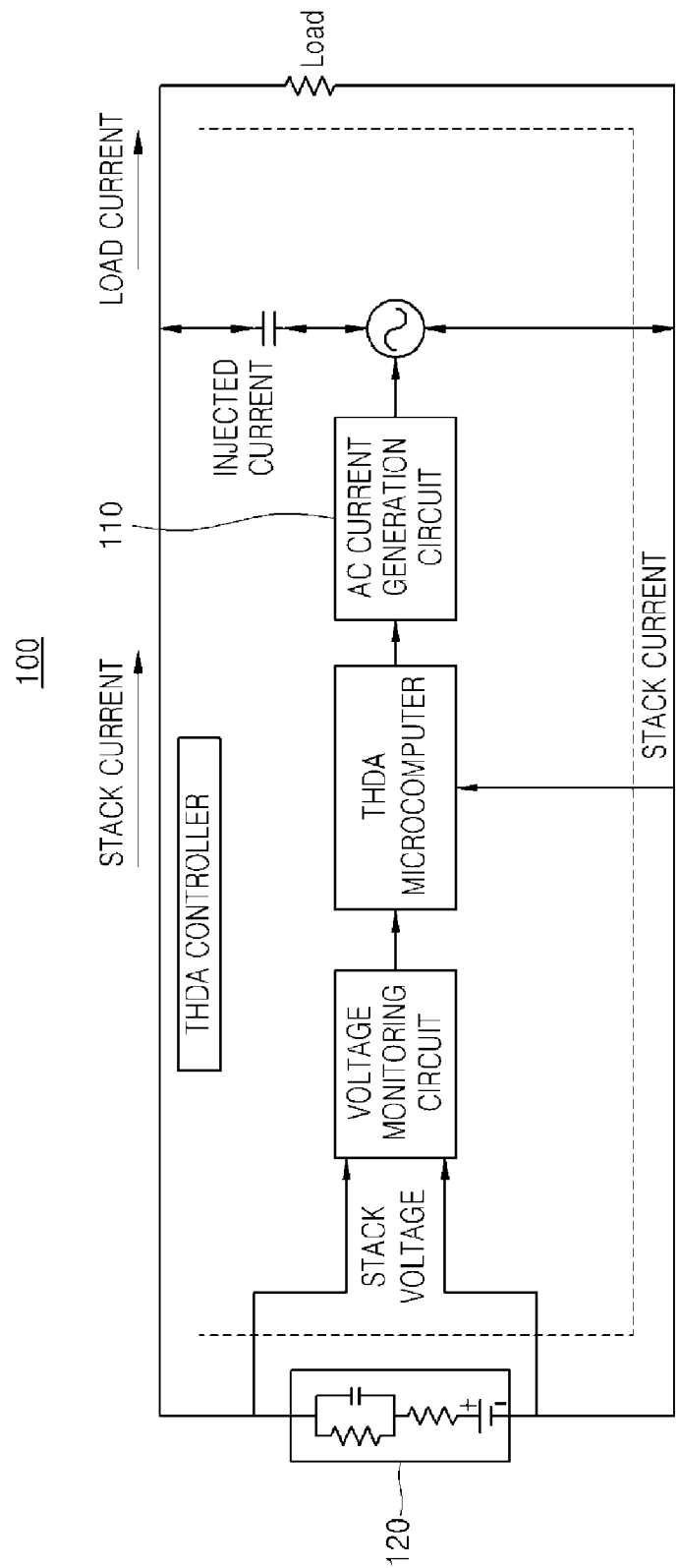
FIG. 1 is a connection state diagram of an apparatus for generating an injected current of a fuel cell stack to perform a process of generating an injected current of a fuel cell stack according to an embodiment of the present invention.
Figure 2:
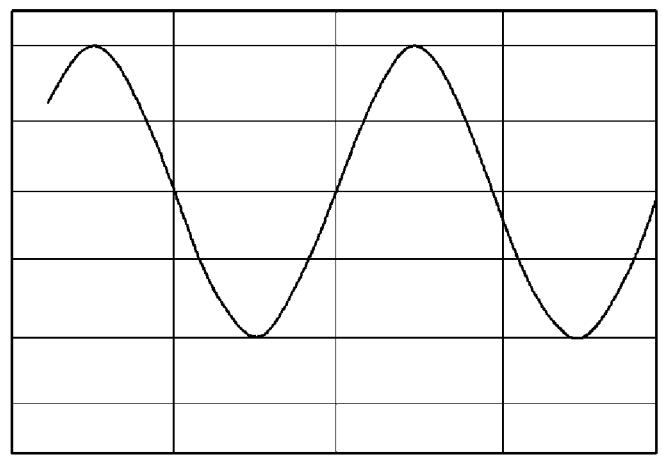
FIG. 2 is a diagram illustrating an AC current used to generate an AC current.
Figure 2:
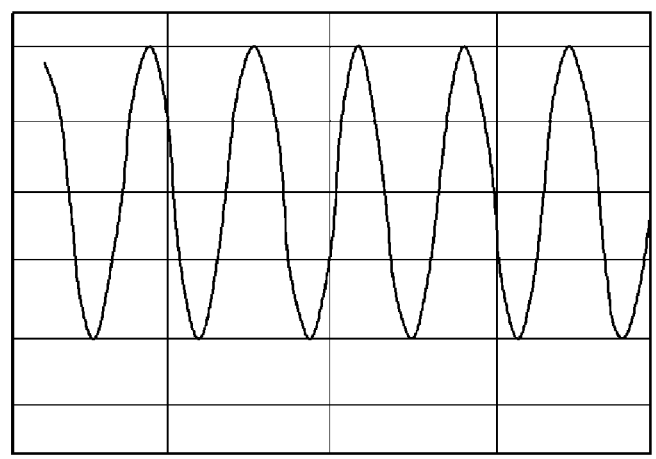
Figure 3:
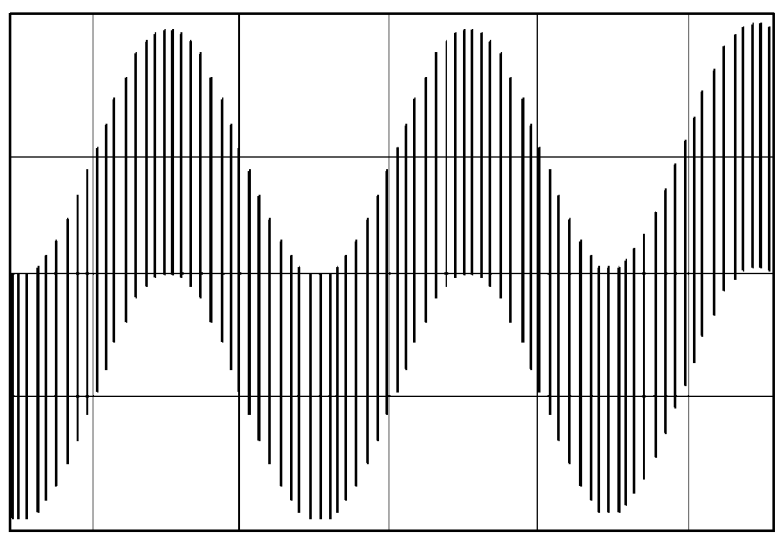
FIG. 3 is a diagram illustrating an AC current generated by an AC current generator illustrated in FIG. 1.

FIG. 1 is a connection state diagram of an apparatus for generating an injected current of a fuel cell stack to perform a method of generating an injected current of a fuel cell stack according to an embodiment of the present invention, FIG. 2 is a diagram illustrating an AC current used to generate an AC current, and FIG. 3 is a diagram illustrating an AC current generated by an AC current generator illustrated in FIG. 1.

Referring to FIGS. 1 to 3, an apparatus 100 for generating an injected current of a fuel cell stack includes a fuel cell stack 120 and an AC current generator 110.

The AC current generator 110 may generate an AC current in a form in which a first AC current like a graph 210 of FIG. 2 to calculate total harmonic distortion (THD) is synthesized with a second AC current like a graph 220 of FIG. 2 to calculate impedance. According to one embodiment of the present invention, the AC current generator 110 may generate an AC current like a graph 300 of FIG. 3.

The fuel cell stack 120 is configured by continuously arranging a plurality of unit cells and starts to operate when being applied with a synthesized frequency current.

The apparatus 100 for generating an injected current of a fuel cell stack of FIG. 1 may further include a fuel cell stack fault diagnosis unit (not illustrated) which diagnoses a fault of the fuel cell stack 120 by using an output voltage of the fuel cell stack 120. According to the embodiment of the present invention in which the apparatus 100 for generating an injected current of a fuel cell stack of FIG. 1 further includes the fuel cell stack fault diagnosis unit, the apparatus 100 for generating an injected current of a fuel cell stack may further include a first frequency filter and a second frequency filter which filter the output voltage of the fuel cell stack 120 to extract diagnosis data, and in this case, for the operation thereof, a connection structure of FIG. 1 may be changed. Hereinafter, the case in which the apparatus 100 for generating an injected current of a fuel cell stack of FIG. 1 further includes the fuel cell stack fault diagnosis unit will be described.

The first frequency filter receives the output voltage of the fuel cell stack 120 to be able to extract a specific frequency to a frequency of the specific frequency or more as the diagnosis data. The first frequency filter may provide the diagnosis data to the fuel cell stack fault diagnosis unit.

According to the embodiment of the present invention, the first frequency filter is a filter which receives the output voltage of the fuel cell stack 120 to pass through a fundamental wave frequency to a harmonic frequency which is used to calculate the total harmonic distortion, thereby extracting the diagnosis data. For example, the first frequency filter may extract a frequency of 10 Hz or more from the output voltage of the fuel cell stack 120. According to the embodiment of the present invention, the first frequency filter may include a high pass filter (HPF).

The second frequency filter receives the output voltage of the fuel cell stack 120 to be able to extract a specific frequency as the diagnosis data. The second frequency filter may provide the diagnosis data to the fuel cell stack fault diagnosis unit.

According to the embodiment of the present invention, the second frequency filter is a filter which receives the output voltage of the fuel cell stack 120 to pass through the specific frequency used to calculated impedance, thereby extracting the diagnosis data. For example, the second frequency filter may extract a frequency of 300 Hz. According to the embodiment of the present invention, the second frequency filter may include a band pass filter (BPF).

The fuel cell stack fault diagnosis unit diagnoses the fault of the fuel cell stack 120 by using the diagnosis data received from the first frequency filter and the second frequency filter, respectively.

According to the embodiment of the present invention, the fuel cell stack fault diagnosis unit may calculate the total harmonic distortion by using the specific frequency to the frequency of the specific frequency or more, which are received from received from the first frequency filter, as the diagnosis data and may diagnose the fault of the fuel cell stack 120 by using the total harmonic distortion. For example, the fuel cell stack fault diagnosis unit receives the fundamental wave frequency to the harmonic frequency from the first frequency filter and may diagnose the fault of the fuel cell stack 120 by using a ratio of the harmonic frequency to the fundamental wave frequency. The fuel cell stack fault diagnosis unit may diagnose that the fuel cell stack 120 is faulty when the ratio of the harmonic frequency to the fundamental wave frequency is the specific ratio or more.

According to another embodiment of the present invention, the fuel cell stack fault diagnosis unit may diagnose the fault of the fuel cell stack 120 by using the impedance of the specific frequency received from the second frequency filter as the diagnosis data. For example, the fuel cell stack fault diagnosis unit may determine that an electrolyte membrane of the fuel cell stack 120 is in a dried state when the specific frequency received from the second frequency filter is the specific frequency or more. As another example, the fuel cell stack fault diagnosis unit may determine that the electrolyte membrane of the fuel cell stack 120 is in a wetting state when the impedance of the specific frequency received from the second frequency filter is the specific impedance or less.

Figure 4:
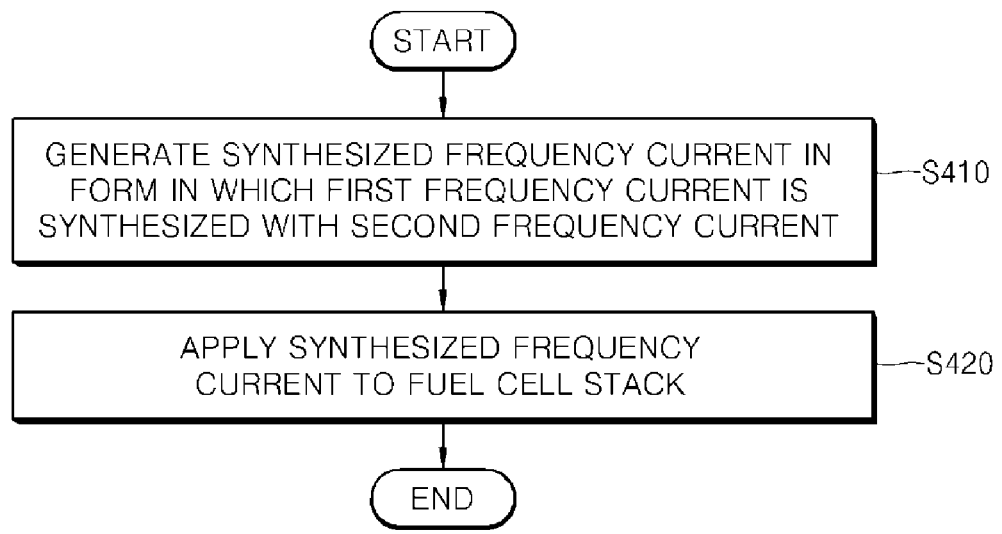
FIG. 4 is a flow chart for describing a method for generating an injected current of a fuel cell stack according to an embodiment of the present invention.

FIG. 4 is a flow chart for describing a method for generating an injected current of a fuel cell stack according to an embodiment of the present invention.

Referring to FIG. 4, the apparatus 100 for generating an injected current of a fuel cell stack generates a synthesized frequency current in a form in which a first frequency current is synthesized with a second frequency current (S410). The first frequency current and the second frequency current may be each used to calculate at least one of the total harmonic distortion and the impedance. The apparatus 100 for generating an injected current of a fuel current stack applies the synthesized frequency current to the fuel cell stack (S420).

According to the embodiments of the present invention, the hardware configuration may be reduced by applying the synthesized frequency current of the AC current for calculating the total harmonic distortion (THD) and the AC current for calculating the impedance to the fuel cell stack, without generating the AC current for calculating the total harmonic distortion (THD) and the AC current for calculating the impedance, respectively, thereby reducing the price and size of the fuel cell stack.

According to the embodiments of the present invention, the impedance and the total harmonic distortion may be simultaneously monitored by using the data acquired by filtering the output voltage of the fuel cell stack to diagnose the state of the fuel cell stack, thereby improving the diagnosis decomposition ability twice or larger.

Hereinabove, although specific embodiments of the present invention have been described, various modifications may be made without departing from the scope of the present invention. Accordingly, the scope of the present invention is not construed as being limited to the described embodiments but is defined by the appended claims as well as equivalents thereto.

Although the present invention has been described with reference to the exemplary embodiments and the accompanying drawings, it is not limited to the above-mentioned exemplary embodiments but may be variously modified and changed from the above description by those skilled in the art to which the present invention pertains. Therefore, the scope and spirit of the present invention should be understood only by the following claims, and all of the equivalences and equivalent modifications to the claims are intended to fall within the scope and spirit of the present invention.

What is claimed is:

1. A method for generating an injected current of a fuel cell stack performed by an apparatus for generating an injected current of a fuel cell stack, the method comprising:
    generating a synthesized frequency current in a form in which a first frequency current is synthesized with a second frequency current;
    applying the synthesized frequency current to the fuel cell stack; and
    determining whether the fuel cell stack is faulty by using an output voltage of the fuel cell stack,
    wherein the first frequency current and the second frequency current are each used to calculate at least one of total harmonic distortion and impedance, and
    wherein the determining whether the fuel cell stack is faulty includes
        passing the output voltage of the fuel cell stack through a band pass filter which passes through only a specific frequency and a high pass filter which passes through the specific frequency to a frequency of the specific frequency or more respectively;
        extracting a harmonic frequency from a fundamental wave frequency by passing the stack voltage through the high pass filter; and
        extracting the specific frequency by passing the stack voltage through the band pass filter.

2. The method of claim 1, wherein the determining whether the fuel cell stack is faulty includes determining whether the fuel cell stack is faulty depending on a ratio of the harmonic frequency to the fundamental wave frequency which is extracted by the high pass filter.

3. The method of claim 2, wherein the determining whether the fuel cell stack is faulty includes determining that the fuel cell stack is faulty when the ratio of the harmonic frequency to the fundamental wave frequency is a specific ratio or more.

4. The method of claim 1, wherein the determining whether the fuel cell stack is faulty includes determining whether the fuel cell stack is in a wetting state by using the impedance of the specific frequency extracted by the band pass filter.

5. The method of claim 4, wherein the determining whether the fuel cell stack is faulty includes determining that an electrolyte membrane of the fuel cell stack is in a dried state when the impedance of the specific frequency is specific impedance or more.

6. The method of claim 4, wherein the determining whether the fuel cell stack is faulty includes determining that the electrolyte membrane of the fuel cell stack is in a wetting state when the impedance of the specific frequency is the specific impedance or less.

* * * * *